United States Patent
Valliappan et al.

(10) Patent No.: US 10,097,313 B2
(45) Date of Patent: Oct. 9, 2018

(54) BACKCHANNEL PROTOCOL FOR LINK TRAINING AND ADAPTATION

(71) Applicant: AVAGO TECHNOLOGIES GENERAL IP (SINGAPORE) PTE. LTD., Singapore (SG)

(72) Inventors: Magesh Valliappan, Austin, TX (US); Anand Kumar Pathak, Austin, TX (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 101 days.

(21) Appl. No.: 15/226,545

(22) Filed: Aug. 2, 2016

(65) Prior Publication Data

US 2018/0041305 A1    Feb. 8, 2018

(51) Int. Cl.
H04L 1/00       (2006.01)
H04L 12/26      (2006.01)
H04L 25/03      (2006.01)

(52) U.S. Cl.
CPC .......... *H04L 1/0045* (2013.01); *H04L 1/0063* (2013.01); *H04L 1/0073* (2013.01); *H04L 25/03* (2013.01); *H04L 43/0894* (2013.01)

(58) Field of Classification Search
None
See application file for complete search history.

(56) References Cited

U.S. PATENT DOCUMENTS

| 8,218,537 | B1 * | 7/2012 | Gui ........................ H04L 49/40 370/369 |
| 9,210,007 | B1 * | 12/2015 | Berke ............... H04L 25/03146 |
| 9,397,872 | B2 * | 7/2016 | Kamali .................... H04B 3/46 |
| 2007/0016835 | A1 * | 1/2007 | Hronik ............. G01R 31/31718 714/727 |
| 2015/0012677 | A1 * | 1/2015 | Nagarajan ........... G06F 13/4022 710/106 |
| 2015/0295679 | A1 | 10/2015 | Valliappan |
| 2016/0164703 | A1 * | 6/2016 | Stone ................ H04L 25/03057 398/140 |

\* cited by examiner

*Primary Examiner* — Justin R Knapp
(74) *Attorney, Agent, or Firm* — Oblon, McClelland, Maier & Neustadt, L.L.P.

(57) ABSTRACT

An electronic device includes circuitry configured to establish a steady-state connection with another device via a communication link. A backchannel data frame is detected in a steady-state data stream received from the other device via the communication link at a first predetermined data rate. The circuitry is configured to modify one or more signal transmission parameters based on signal information included in the backchannel data frame.

19 Claims, 9 Drawing Sheets

BACKCHANNEL PROTOCOL FOR LINK TRAINING AND ADAPTATION

TECHNICAL FIELD

The present disclosure relates to serializer/deserializer (SerDes) communications, and more particularly, but not exclusively, to remote training and adaptation of a SerDes device.

BACKGROUND

In modern high speed communication links between serializer/deserializer (SerDes) devices such as Ethernet switches, the receiver typically carries the burden of complexity to deliver a stable, reliable link with a low error rate (e.g., 1 error in $10^{18}$ received bits). This results in receivers that are expensive to design and have high power consumption. In addition, link training is typically performed during link start-up for devices that function as endpoints for communication links but stopped once the communication link transitions to steady-state operations.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In an exemplary implementation, an electronic device includes circuitry configured to establish a steady-state connection with another device via a communication link. A backchannel data frame is detected in a steady-state data stream received from the other device via the communication link at a first predetermined data rate. The circuitry is configured to modify one or more signal transmission parameters based on signal information included in the backchannel data frame.

In another exemplary implementation, a process includes establishing, at an electronic device with circuitry, a steady-state connection with another device via a communication link; detecting, via the circuitry, a backchannel data frame in a steady-state data stream received from the another device via the communication link at a first predetermined data rate; and modifying, via the circuitry, one or more signal transmission parameters of a transmitter included in the electronic device based on signal information included in the backchannel data frame.

In another exemplary implementation, an electronic device includes circuitry configured to establish a steady-state connection with another device via an Ethernet communication link, extract one or more modified signal transmission parameters from a detected backchannel data frame in a data stream received from the another device via the Ethernet communication link, and modify one or more signal processing parameters of an Ethernet transmitter included in the electronic device based on the one or more modified signal transmission parameters included in the backchannel data frame.

Aspects of the present disclosure are directed to a system, device, and method for providing a backchannel protocol for training and adapting electronic devices connected by a communication link to dynamically changing link conditions. The implementations described herein provide a way to improve reliability of the data streams transmitted to a local device (LD) from a remote link partner (LP) by communicating with the remote LP via the backchannel during steady-state link conditions. For example, a receiver at the LD can measure signal distortions in a received data stream that affect quality of the received data, such as duty cycle distortion (DCD) or digital-to-analog converter (DAC) skew and determine modified signal transmission parameters for a transmitter at the remote LP. In some implementations, modifying signal transmission parameters of the remote LP, such as taps of a finite impulse response (FIR) filter is less complex, consumes less power, and can provide better channel equalization than applying an equalizer such as a decision feedback equalizer (DFE) at the receiver. The modified signal transmission parameters can be encoded into a backchannel data frame that is inserted into a data stream transmitted from the LD at a predetermined data rate. The remote LP detects the backchannel data frame in the data stream, decodes the bits of the backchannel data stream to extract the modified signal transmission parameters, and applies the modified signal transmission parameters to the transmitted data stream. The implementations described herein provide the ability to continuously monitor the link conditions at the receiver of the local device and adaptively train the transmitter of the remote LP during steady-state conditions based on dynamically changing communication link conditions.

Figure 1:
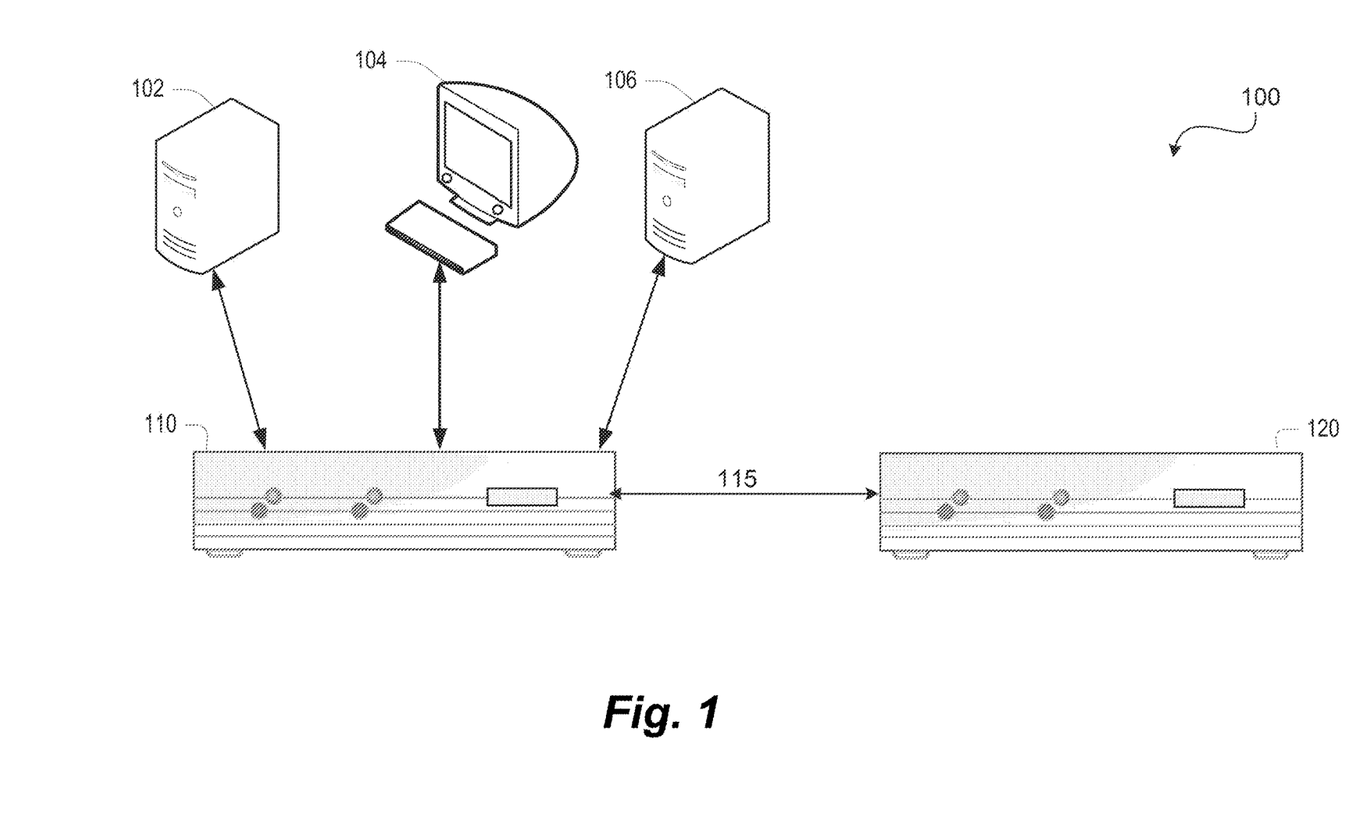
FIG. 1 is a high level diagram illustrating an example of a network environment for application of backchannel link training and adaptation.

FIG. 1 is a high level diagram illustrating an example of a network environment 100 for application of backchannel link training and adaptation. The example network environment 100 may include various electronic devices 102, 104, 106, such as one or more servers, computers, switches, routers, network components, network devices, etc. In one or more implementations, the network environment 100 may include a set of servers, a server bank, or a vast network of interconnected computers or network devices. The network environment 100 may also include one or more other devices, such as, for example, one or more wireless telephone, mobile device or mobile phone, smart phone, communications device, tablet, personal computer (PC), set-top box (STB), personal digital assistant (PDA), palmtop computer, laptop computer, desktop computer, land-line telephone, control system, camera, scanner, facsimile machine, printer, pager, personal trusted device, web appliance, network router, switch or bridge, or any other machine or device.

One or more network devices, such as switch device 110, may be implemented to facilitate communication between the one or more electronic devices 102, 104, 106 of the network environment 100. The electronic devices 102, 104, 106 of the network environment 100, may be connected or otherwise in communication with each other, through or using the switch device 110. Examples of the switch device 110 include an Ethernet switch such as upper or lower layer switches or an endpoint device. For example, the electronic devices 102, 104, 106 may each be coupled to a physical port of the switch device 110 by at least one network transmission line, such as an Ethernet transmission line, a coaxial transmission line, an optical transmission line, or generally any transmission line. In one or more implementations, one or more of the electronic devices 102, 104, 106 may be wirelessly coupled to the network device 110.

In one or more implementations, one or more of the electronic devices 102, 104, 106 may be referred to as a link partner (LP) of the switch device 110. In one or more implementations, a remote LP may include another switch device 120 coupled to the switch device 110 via a link (e.g., Ethernet link) 115. The type of the link 115 depends on the distance between the switch device 110 and 120. For example, the link 115 can be provided using an Ethernet backplane (e.g., for short distances up to 1 m), a twinax cable (e.g., for distances up to 15 m), twisted pairs (e.g., for distances up to 100 m), a multimode fiber (e.g., for distances up to 5 km), and a single-mode fiber (e.g., for distances up to 40 km). In some implementations, the link 115 may also be an optical link. Also, the switch devices 110 and 120 may be any type of SerDes devices that are capable of performing high speed communications at data rates that are greater than WI-FI communication data rates. For example, the link 115 may be a 25G, 50G, 100G, 400G, or greater link.

The switch devices 110 and 120 and/or one or more of the electronic devices 102, 104, 106 may implement backchannel link training and adaptation. In some implementations, the switch devices 110 and 120 include a receiver and a transmitter that provide that provide a duplex link for two-way communications so that either switch device 110 or 120. For example, the switches 110 or 120 can function as the LD that receives a transmission data stream and measures the signal distortions at the receiver. The transmitter of the LD includes an encoder with associated logic gates and circuitry configured to generate the backchannel data frame with the modified signal transmission parameters and transmit the backchannel data frame to the remote LP at the predetermined data rate. The switches 110 or 120 can also function as the remote LP with a receiver that includes a decoder and other associated logic gates and circuitry configured to receive data streams transmitted from the other switch device 110 or 120 via the link 115 that include the backchannel data frames with the modified signal transmission parameters. The decoder extracts the modified signal transmission parameters from the backchannel data frame which are sent to control circuitry for the transmitter within the device 110 or 120. The control circuitry modifies the FIR filter taps or other processing parameters of the transmitter based on the modified signal parameters. In some implementations, the processes described herein with respect to the devices 110 and 120 are performed in a physical coding sublayer (PCS), which processes the data received from or transmitted to the link 115, and a physical medium dependent (PMD) layer of the devices 110 and 120 includes a transmitter and/or receiver that is configured to transmit and/or receive the generated data from the PCS on the link 115.

Throughout the disclosure, the LD is described with respect to encoding the backchannel data frame into the transmission data stream, and the remote LP is described with respect to detecting a received backchannel data frame, extracting the modified signal transmission parameters, and updating the transmitter based on the modified signal parameters. However, it can be understood that both the LD and the remote LP can perform the functions of both the LD and the remote LP described further herein.

Figure 2A:
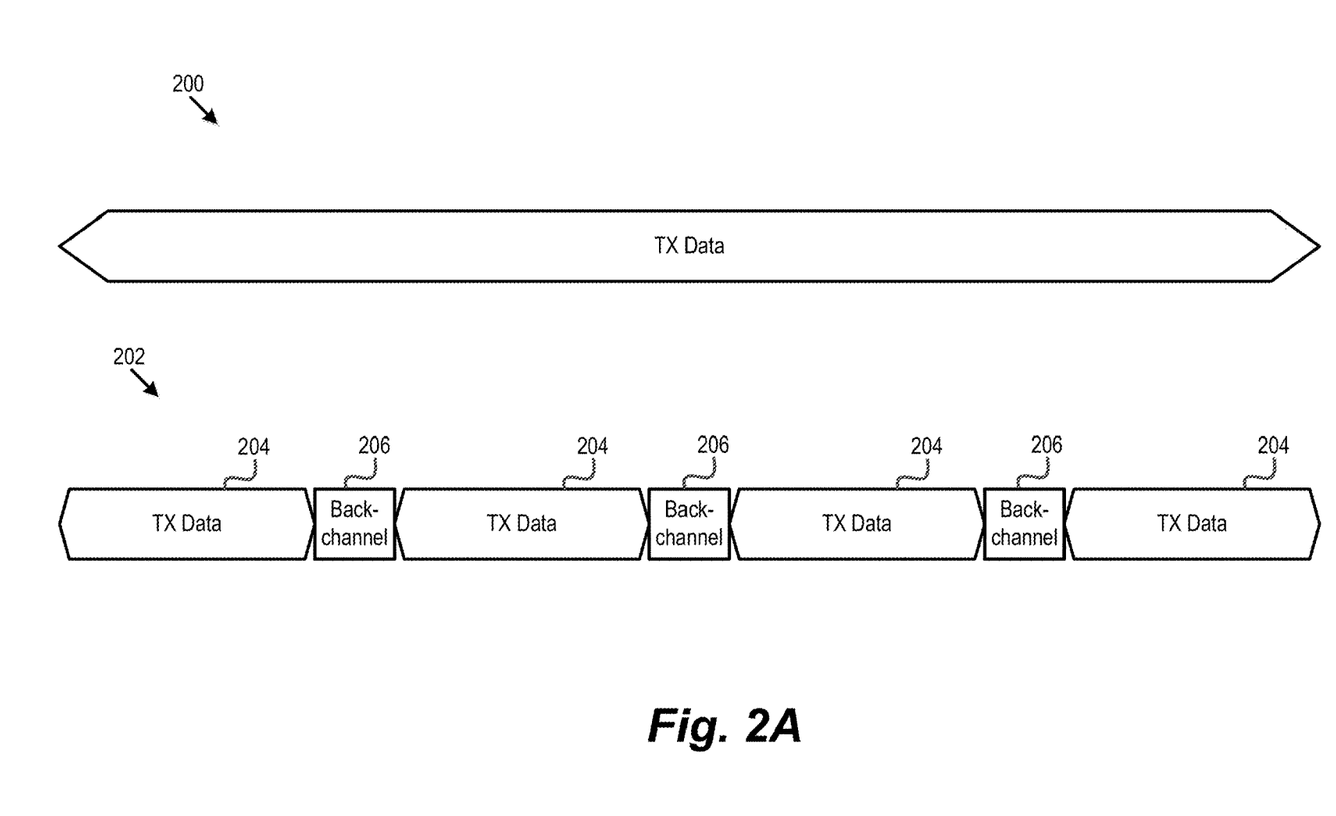
FIG. 2A is an exemplary diagram of transmission data exchanged between a local device and a link partner.

FIG. 2A is an exemplary diagram of transmission data exchanged between the LD and remote LP. For example, diagram 200 is an exemplary transmission data stream that is transmitted from the LD to the remote LP during steady-state, and diagram 202 is an exemplary steady-state transmission data stream that includes one or more backchannel data frames 206 encoded into transmission data 204 at a predetermined rate. In one implementation, the backchannel data frames 206 have a data length of forty bits. Table 1 provides exemplary values for intervals between backchannel frame transmissions that correspond to the predetermined rate at which the backchannel data frames 206 are transmitted. The value of the predetermined transmission rate can be stored as a three-bit value in a register of the LD and/or remote LP and can be based on one or more factors that can include an amount of variability of one or more communication link parameters or a minimum transmission data bandwidth for the link between the LD and the remote LP. For example, if the communication link connecting the LD and the remote LP experiences cross-talk from one or more adjacent communication links, then the predetermined rate of transmission of the backchannel data frames 206 may be greater than for a communication link that does not experience the effects of cross-talk from adjacent links. In addition, the LD can increase the data rate for the transmission data 204 so that the minimum transmission data bandwidth for the link can be achieved while still transmitting the backchannel data frames 206.

TABLE 1

| Data rate register value | Back-Channel Frame Interval Value K (128 × K cycles) | Frame Interval in tclk20 cycle (frame length for 56G) | Backchannel Overhead % of traffic (ppm) |
|---|---|---|---|
| 0 | 1 | 128 (91 ns) | 0.7813% (7813 ppm) |
| 1 | 16 | 2048 (1.5 us) | 0.0488% (488 ppm) |
| 2 | 32 | 4096 (3 us) | 0.0244% (244 ppm) |
| 3 | 64 | 8192 (6 us) | 0.0122% (122 ppm) |

TABLE 1-continued

| Data rate register value | Back-Channel Frame Interval Value K (128 × K cycles) | Frame Interval in tclk20 cycle (frame length for 56G) | Backchannel Overhead % of traffic (ppm) |
|---|---|---|---|
| 4 | 128 | 16384 (12 us) | 0.0061% (61 ppm) |
| 5 | 256 | 32768 (23 us) | 0.0031% (31 ppm) |
| 6 | 512 | 65536 (47 us) | 0.0015% (15 ppm) |
| 7 | 1024 | 131072 (94 us) | 0.0008% (8 ppm) |

In some implementations, the remote LP does not have foreknowledge of the locations of the backchannel data frames 206 in the transmission data stream or the predetermined rate of transmission, which allows the remote LP to operate in multiple data transmission protocols that may or may not include the backchannel data frames 206. Once the LD and remote LP have performed one or more start-up processes that may include an exchange or negotiation of data transfer parameters, link training, or the like, the LD and remote LP can transition to steady-state operations where the LD and remote LP transmit and receive data across the communication link with the negotiated data transfer parameters. The receiver of the remote LP can perform a frame locking process to detect a presence of the backchannel data frames 206 in the incoming data stream.

In some implementations, once the steady-state data transmissions operations commence, the LD transmits a locking data frame to the remote LP via the communication link at a locking data rate that may correspond to the predetermined data rate of the backchannel data frames 206 or may be unequal to the predetermined data rate of the backchannel data frames 206. For example, the locking data rate may be faster than the predetermined data rate of the backchannel data frames 206. In addition, the locking data frame may also be forty bits long and have a bit format that corresponds to the bit format of the backchannel data frame 206. Once the remote LP detects the locking data frame and outputs a response message to the LD, the LD transmits the backchannel data frames 206 to the remote LP at the predetermined rate that include the modified signal transmission parameters. Details of the frame locking process and backchannel messaging process are discussed further herein.

Figure 2B:
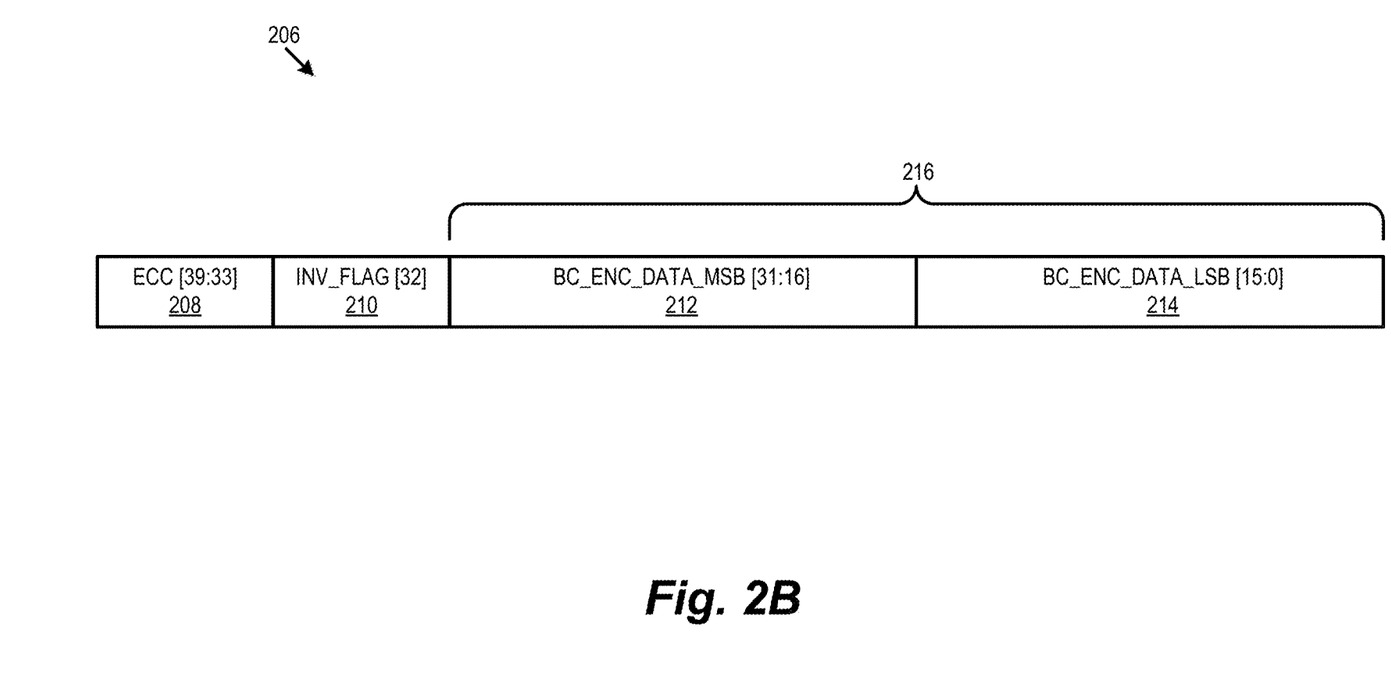
FIG. 2B is an exemplary diagram of a backchannel frame format.

FIG. 2B is an exemplary diagram of a format for the backchannel data frame 206. In some implementations, the backchannel data frame 206 includes one or more sets of bits that are associated with implementing the backchannel protocol for training and adapting a transmitter of the remote LP based on a link environment. For example, the backchannel data frame 206 has forty bits that include seven error correction code (ECC) bits 208, an inversion flag bit 210, and sixteen-bit signal information data word bits 216 that can include a most significant data word 212 and a least significant data word 214. In some implementations, the most significant data word 212 is a status data word indicating a current status of the LD. In some implementations, the current status of the LD can indicate that the LD is ready to send and/or receive data from the remote LP. In addition, the least significant data word 214 may be a control data word that indicates one or more modified signal transmission parameters for the transmitter of the remote LP. The format of the backchannel data frame 206 is exemplary and other formats can also be used, for example, the backchannel data frame 206 may be longer or shorter than forty bits, positions of the sets of bits may be interchanged, or other types of information may be included in the backchannel data frame 206.

The seven ECC bits 208 correspond to an ECC that is calculated by the LD for the thirty-two bits associated with the signal information data word bits 216. The ECC bits 208 support one bit error correction and two bit error detection at the remote LP to improve the bit error rate (BER) of the bits transmitted in the backchannel data frame 206. Also, if the remote LP detects errors in consecutively received backchannel data frames for greater than a predetermined number of received backchannel data frames, then the remote LP can determine that the backchannel data frame 206 is in an out of lock (OOL) condition, and the remote LP can output a reframing interrupt signal to the LD to indicate that backchannel data frame 206 is OOL so that the LD can recommence the frame locking process.

In addition, the inversion flag bit 210 is toggled by the encoder of the LD with each backchannel data frame transmission to provide DC balance to the data stream transmitted across the communication link. When the flag inversion bit is equal to one, the ECC bits 208 and the signal information data word bits 216 are inverted. When the backchannel data frame 206 is received by the remote LP, the decoder performs an exclusive or (XOR) operation of all of the bits [39:0] of the backchannel data frame 206 with the inversion flag bit 210 and re-performs the ECC calculation. If there is an error in the inversion flag bit 210, then the output of the result of the XOR operation will have uncorrectable errors, and the decoder discards the backchannel data frame 206. In addition, if the flag inversion bit 210 is equal to one, the decoder of the remote LP inverts the signal information data word bits 216 in order to determine the current status and/or modified signal transmission parameters.

In some implementations, when the frame locking process is performed, the locking frame transmitted from the LD to the remote LP has a format that corresponds to the format of the backchannel data frame 206. In some implementations, the ECC bits 208 in the locking frame are used by the decoder of the remote LP to detect the locking frame within the data stream transmitted from the LD. For example, the decoder performs the ECC calculation for sets of forty bits received from the LD. If the bits fail the ECC check, then the decoder rotates the bits by one symbol and re-performs the ECC check. If the bits pass the ECC check, then the decoder can determine that frame alignment has been achieved. Also, the encoder of the LD encodes a predetermined locking data word into the bit positions for the most significant data word bits 212 or the least significant data word bits 214. If the decoder of the remote LP detects greater than a predetermined number of locking data frames that include the locking data word, then the remote LP sets a frame lock condition and transmits a frame lock interrupt to the LD that indicates that the frame lock condition has been set. In response to receiving the frame lock interrupt, the LD can commence transmitting the backchannel data frames 206 to the remote LP at the predetermined data rate that include the modified signal transmission parameters.

Figure 3A:
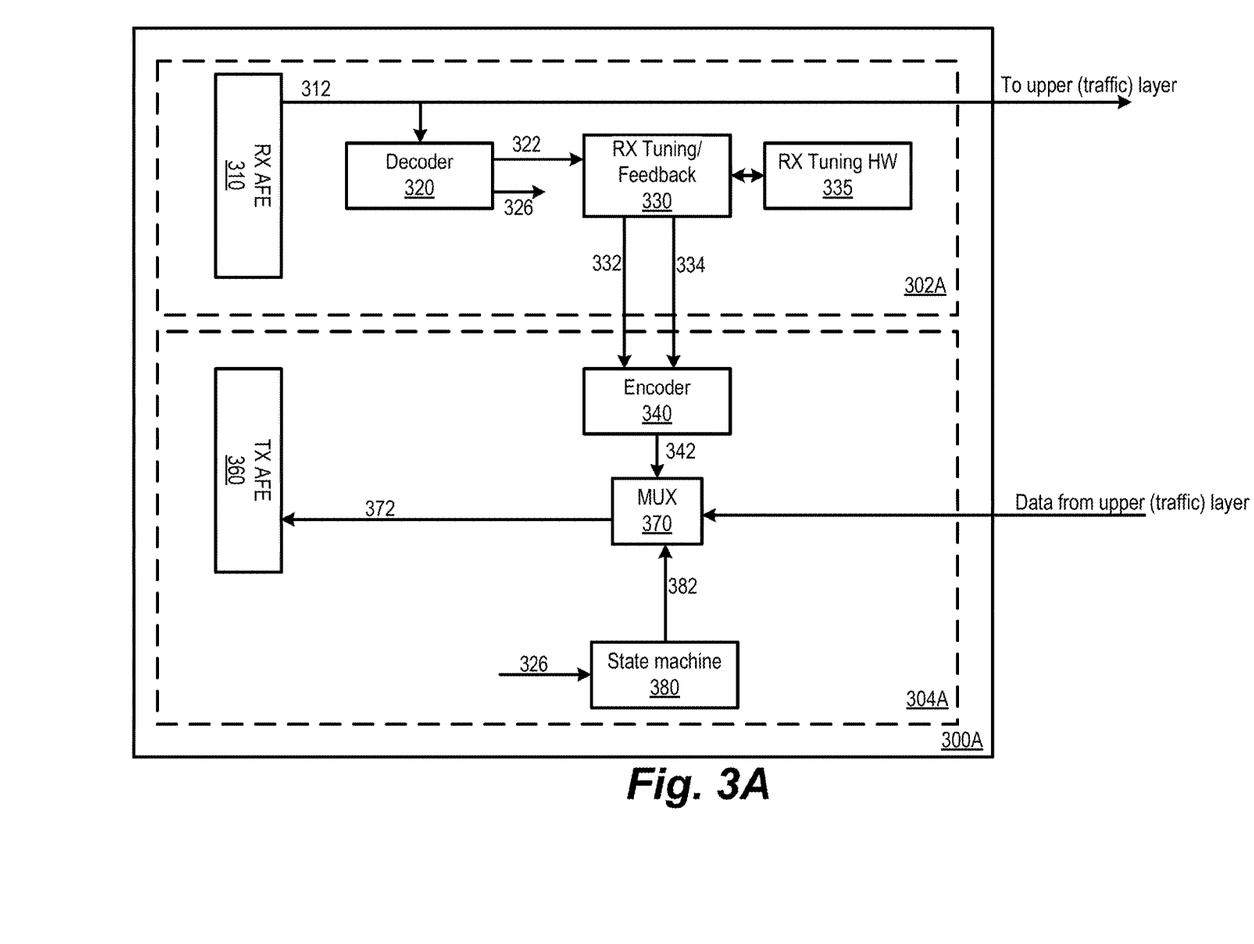
FIG. 3A is a block diagram illustrating an architecture of a Serializer/Deserializer (SerDes) device.
Figure 3B:
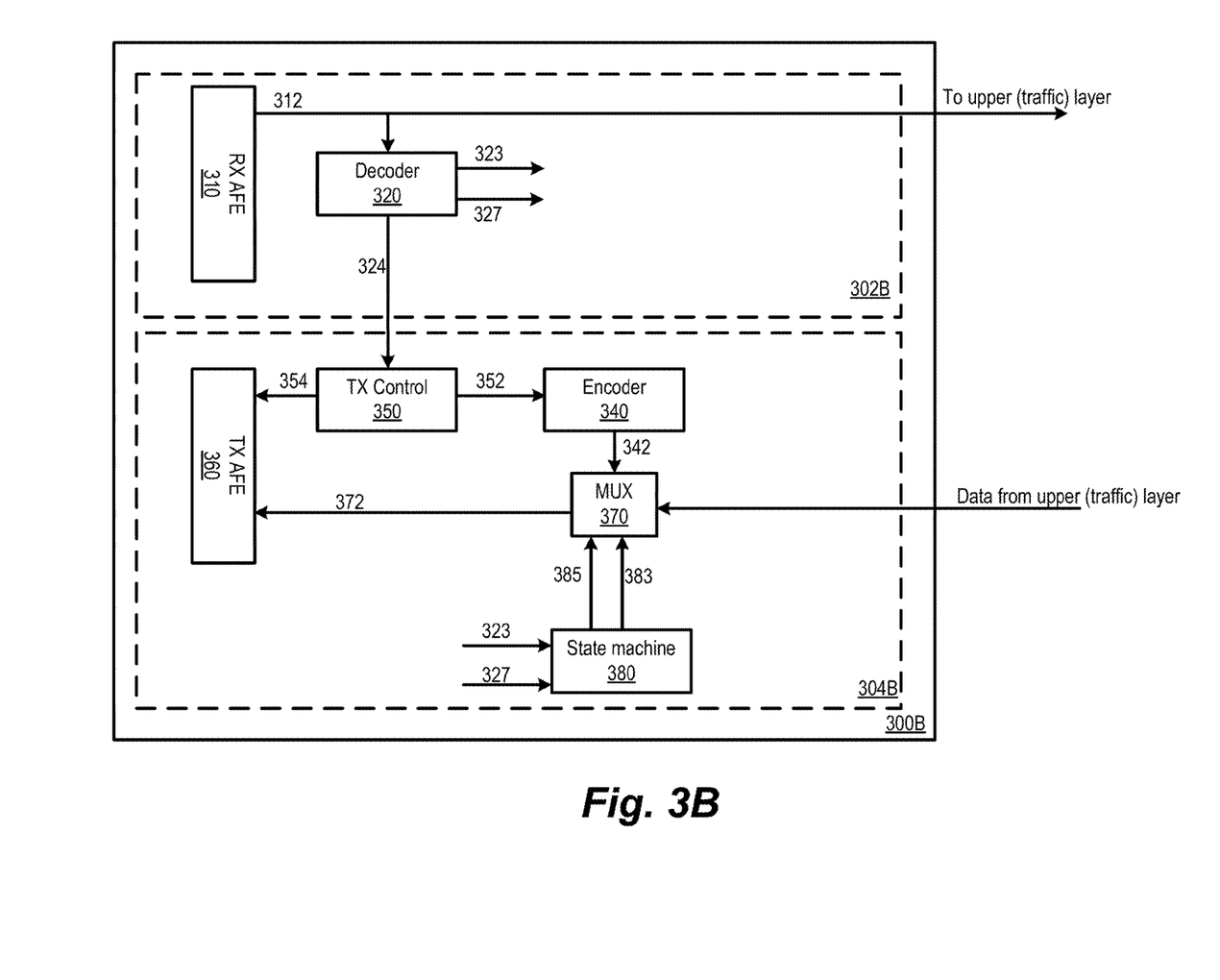
FIG. 3B is a block diagram illustrating an architecture of a SerDes device.

FIGS. 3A and 3B are block diagrams illustrating exemplary architectures of SerDes devices 300A and 300B with backchannel training and adaptation capability. Examples of the SerDes devices 300A and 300B can include an Ethernet switch device, such as the LD or remote LP represented by the switch devices 110 and 120 in FIG. 1. For example, SerDes device 300A in FIG. 3A represents the LD that measures distortions of received signals, determines modified signal parameters for the transmitter of the remote LP, and encodes the modified signal parameters into the backchannel data frame that is transmitted to the remote LP at the predetermined data rate. SerDes device 300B in FIG. 3B represents the remote LP that detects the backchannel data frames in a received data stream, decodes the modified signal transmission parameters, and modifies one or more transmitter component parameters to reflect the modified signal transmission parameters. It can be understood that both the LD and the remote LP include all of the components and perform all of the functions described with respect to both of the SerDes devices 300A and 300B. In one or more implementations, the SerDes devices 300A and 300B are compliant with clause 72/93 of the IEEE 802.3 specifications and form endpoints of an Ethernet communication link.

Turning to FIG. 3A, the SerDes device 300A includes a receiver (RX) block 302A and a transmitter (TX) block 304A. The RX block 302A includes RX analog front-end (AFE) module 310, RX decoder module 320, an RX tuning and feedback module 330, and an RX tuning hardware 335. The TX block 304 includes a TX AFE module 360, a TX encoder module 340, a multiplexer (MUX) 370, and a state machine 380.

In some implementations, the RX AFE module 310 can recover a received signal (e.g., data bits) 312 from a received radio-frequency (RF) signal of the data stream transmitted by the remote LP and sends the received signal 312 to the RX decoder module 320, the RX tuning hardware 335, and to an upper (traffic) layer. The RX decoder module 320 monitors the data received from the RX AFE module 310 and decodes the control and status information embedded in a backchannel data frame. The control and status information includes a transmitter update parameter that indicates that the transmitter of the remote LP has updated the local transmitter with the most recently transmitted modified signal transmission parameters. The control and status information can also include a frame lock interrupt signal that indicates that the remote LP has detected the locking data frame and set the frame lock condition as well as an out of lock (OOL) interrupt signal that indicates that the remote LP has lost a lock on the backchannel data frame. The RX decoder module 320 generates signals 322 and 326. The first signal 322 includes the status from the remote LP of the last request made to the remote LP by the SerDes device 300A and is delivered to the RX tuning and feedback module 330. For example, the signal 322 can correspond to the transmitter update parameter that indicates that the transmitter of the remote LP has been updated with the most recently sent modified signal transmission parameters. The signal 326 includes a current locking status of the remote LP, which can indicate whether the frame locking process is in progress, a frame lock condition has been set, or that the remote LP is in the OOL condition, which is sent to the state machine 380.

In some aspects, an RX tuning microcode of the RX tuning and feedback module 330 monitors the quality of the received signal at the local RX (e.g., RX portion of the SerDes device 300A), measures signal distortions in the received data stream due to variations in the link environment, and adjusts AFE settings of the RX 302A to reduce BER. This can be achieved by using the RX tuning hardware 335. The metrics and measured signal distortions are further utilized by a feedback microcode of the RX tuning and feedback module 330 to determine modified signal parameters for the transmitter of the remote LP. The modified signal parameters are sent to the TX encoder module 340 via signal 334. The feedback microcode also forwards the transmitter update parameter to the encoder module 340 via signal 332.

In one or more implementations, the TX encoder module 340 receives signals 332 and 334. The TX encoder module 340 encodes the modified signal transmission parameters derived from signals 332 and 234 into the backchannel data frame, and sends the encoded information to the MUX 370 at the predetermined data rate. The MUX 370 sends the encoded backchannel data frame to the data line 372 for communication to the remote LP. The TX encoder module 340 also encodes the frame locking word into the locking data frame for transmission to the remote LP at the locking data rate during the frame locking process. In between transmissions of the backchannel data frame, the MUX 370 allows the data from the upper traffic layer to flow through the data line 372.

The state machine 380 can be responsible for controlling the transmission of the backchannel data frame or the locking data frame based on the current locking status indicated in the signal 326. In response to receiving the signal 326, the state machine 380 sends signal 382 to the MUX 370 to cause the MUX 370 to output the locking data frame at the locking data rate or the backchannel data frame at the predetermined data rate. For example, if the current locking status indicates that frame locking is in progress or that the remote LP is in the OOL condition, then the signal 382 output from the state machine 380 causes the MUX 370 to output the locking data frame to the data line 372. If the current locking status indicates that the frame lock condition has been set, then the signal 382 causes the MUX 370 to output the backchannel data frame to the data line 372.

The components of the SerDes device 300A can be implemented as hardware components or software components where a processor in the SerDes device 300A executes one or more software instructions associated with the component. In some implementations, the RX tuning and feedback module 330 can be realized in digital logic circuitry or firmware, while the RX decoder module 320, the TX encoder module 340, and the state machine 380 can be implemented in digital logic circuitry that implement one or more software processes.

Turning to FIG. 3B, the SerDes device 300B can be the remote LP that includes features that allow for backchannel training of the device transmitter. For example, the SerDes device 300B, in response to receiving a backchannel data frame, can output a control signal to modify transmitter equalization settings to correspond to the modified signal transmission parameters decoded from the backchannel data frame to achieve a desired BER. This is because the transmitter at the remote LP may not be aware of the length of the link or other environmental variations in link performance and is able to use feedback from the receiver of the LD to enhance the quality of the transmission signal to achieve a BER at the remote LP.

The SerDes device 300B includes RX block 302B and TX block 304B. The RX block 302B includes RX analog front-end (AFE) module 310 and RX decoder module 320. The TX block 304 includes a TX AFE module 360, a TX control module 350, a TX encoder module 340, a multiplexer (MUX) 370, and a state machine 380.

In some implementations, the RX AFE module 310 can recover a received signal (e.g., data bits) 312 from a received radio-frequency (RF) signal of the data stream transmitted by the LD and sends the received signal 312 to the RX decoder module 320 and to an upper (traffic) layer. The RX decoder module 320 monitors the data received from the RX AFE module 310, detects the backchannel data frame in the received signal, performs an ECC calculation, and extracts the modified signal transmission parameters from the backchannel data frame. During the frame locking process, RX decoder module 320 can also extract the locking data frame from the received signal 312. The RX decoder module 320 generates signals 323 and 327 based on ECC calculations performed on the locking data frame or the backchannel data frame, which are sent to the state machine 380. The RX decoder module 320 also outputs signal 324 to the TX control module 350, which includes the modified signal transmission parameters extracted from the backchannel data frame.

For example, the signal 323 corresponds to a frame locking status of the RX decoder module 320. During the frame locking process, the RX decoder module 320 performs the ECC calculation check for sets of forty bits received from the LD. If the bits fail the ECC check, then the RX decoder module 320 rotates the bits by one symbol and re-performs the ECC check. If the bits pass the ECC check and the locking word included in the locking data frame corresponds to the predetermined locking word, then the RX decoder module 320 can determine that frame alignment has been achieved. The signal 323 sent to the state machine 380 indicates whether frame alignment has been achieved and whether the locking word in the received locking data frame corresponds to the predetermined locking data word.

In addition, the signal 327 corresponds to a status of the ECC calculation check performed for a received backchannel data frame. The ECC bits in the backchannel data frame support one bit error correction and two bit error detection at the remote LP to improve the bit error rate (BER) of the bits transmitted in the backchannel data frame 206. The signal 327 output to the state machine 380 indicates whether the received backchannel data frame passed or failed the ECC calculation check.

In some implementations, the TX control module 350 includes a microcode that can be responsible for receiving the modified signal transmission parameters decoded by the RX decoder module 320, validating the signal transmission parameters, applying the modified signal transmission parameters to a local TX FIR filter or other processing components of the transmitter, and generating a response to be sent to the remote LP. In other words, the TX control module 350 can control the quality of the TX signals transmitted by the TX AFE 360 based on the backchannel data frames sent by the LD (e.g., signal 324), by sending the TX control signal 354, which can include FIR filter tap weights (e.g., coefficients of the FIR filter). For example, the modified signal transmission parameters included in the backchannel data frame sent by the LD to the remote LP may include modified second FIR taps. The modified signal transmission parameters are decoded by the RX decoder module 320 and sent to the TX control module 350. The TX control module 350 implements modifications and informs the TX encoder module 340 of a transmitter status via signal 352, which includes a status of the modifications to the signal transmission parameters. The TX encoder module 340 encodes and sends the status to the TX AFE 360 for transmission to the LD.

In one or more implementations, the TX encoder module 340 receives the signal 352 from the TX control module 350. The TX encoder module 340 encodes a status of the implementation of the modified signal transmission parameters at the TX AFE 360 and sends the encoded transmitter status information to the MUX 370. The MUX 370 sends the encoded transmitter status to the data line 372 for communication to the LD. In between transmissions of the transmitter status, the MUX 370 allows the data from the upper traffic layer to flow through the data line 372.

The state machine 380 can be responsible for setting a frame lock condition when a predetermined number of locking frames have been received that include the predetermined locking data word. In response to setting the frame lock condition, the state machine 380 outputs signal 383 to the MUX 370, which causes the MUX 370 to output a frame lock interrupt signal to the LD that indicates to the LD that the frame lock condition has been set, and the LD can commence transmitting the backchannel data frames. The state machine 380 also determines when the OOL condition occurs when a number of consecutively received backchannel data frames fail the ECC calculation check. In response to determining that the OOL condition has occurred, the state machine 380 outputs signal 385 to the MUX 370, which causes the MUX 370 to output a reframing interrupt signal to the LD that indicates to the LD that the remote LP is experiencing the OOL condition.

The components of the SerDes device 300B can be implemented as hardware components or software components where a processor in the SerDes device 300B executes one or more software instructions associated with the component. In some implementations, the TX FIR control module 350 can be realized in digital logic circuitry or firmware, while the RX decoder module 320, the TX encoder module 340, and the state machine 380 can be implemented in digital logic circuitry that implement one or more software processes.

Figure 4:
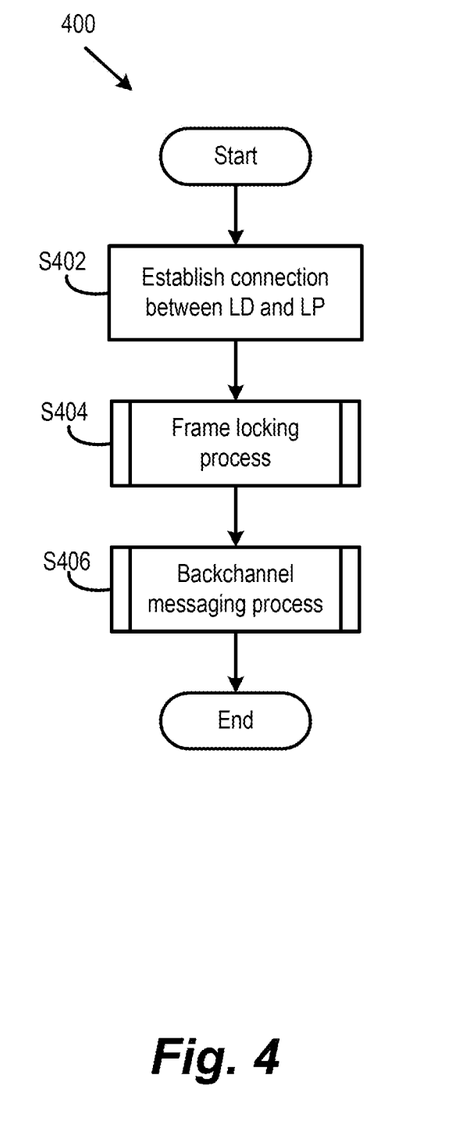
FIG. 4 is an exemplary flowchart of a backchannel protocol adaptation process.

FIG. 4 is an exemplary flowchart of a backchannel protocol adaptation process 400. The backchannel protocol adaptation process 400 is described with respect to the SerDes devices 300A and 300B described previously herein can also be applied to other devices that are able to communicate via SerDes communication links.

At step S402, the LD and remote LP establish a steady-state connection via a SerDes communication link, such as an Ethernet link. In some implementations, when a connection is initially established between the LD and remote LP, the LD and remote LP perform one or more start-up processes that may include an exchange or negotiation of data transfer parameters, link training, or the like. Once the start-up processes have been performed or link conditions stabilize, the LD and remote LP can transition to steady-state operations where the LD and remote LP transmit and receive data across the communication link with the negotiated data transfer parameters.

At step S404, a frame locking process is performed that allows the remote LP to detect the presence of locking data frames in a received data stream that provide information associated with the backchannel data frames. In some implementations, once the steady-state data transmissions operations commence, the LD transmits a locking data frame to the remote LP via the communication link at a locking data rate that may correspond to the predetermined data rate of the backchannel data frames 206 or may be unequal to the predetermined data rate of the backchannel data frames 206. For example, the locking data rate may be faster than the predetermined data rate of the backchannel data frames 206. In addition, the locking data frame may also be forty bits long and have a bit format that corresponds to the bit format of the backchannel data frame 206. Once the remote LP detects the locking data frames in the incoming data stream, the remote LP sets a frame lock condition and outputs a frame lock interrupt signal to the LD to indicate that the LD can commence transmitting the backchannel data frames to the remote LP. Details of the frame locking process are discussed further herein.

At step S406, a backchannel messaging process is performed where the LD encodes backchannel data frames into data stream that included modified signal parameters for the transmitter of the remote LP in order to provide training and adaptation information to the remote LP based on measured link conditions. For example, the LD measures distortions of received signals due to variations in link conditions, determines modified signal parameters for the transmitter of the remote LP, and encodes the modified signal parameters into the backchannel data frame that is transmitted to the remote LP at the predetermined data rate. The remote LP detects the backchannel data frames in a received data stream, decodes the modified signal transmission parameters, and modifies one or more transmitter component parameters to reflect the modified signal transmission parameters. Details regarding the backchannel messaging process are discussed further herein.

Figure 5:
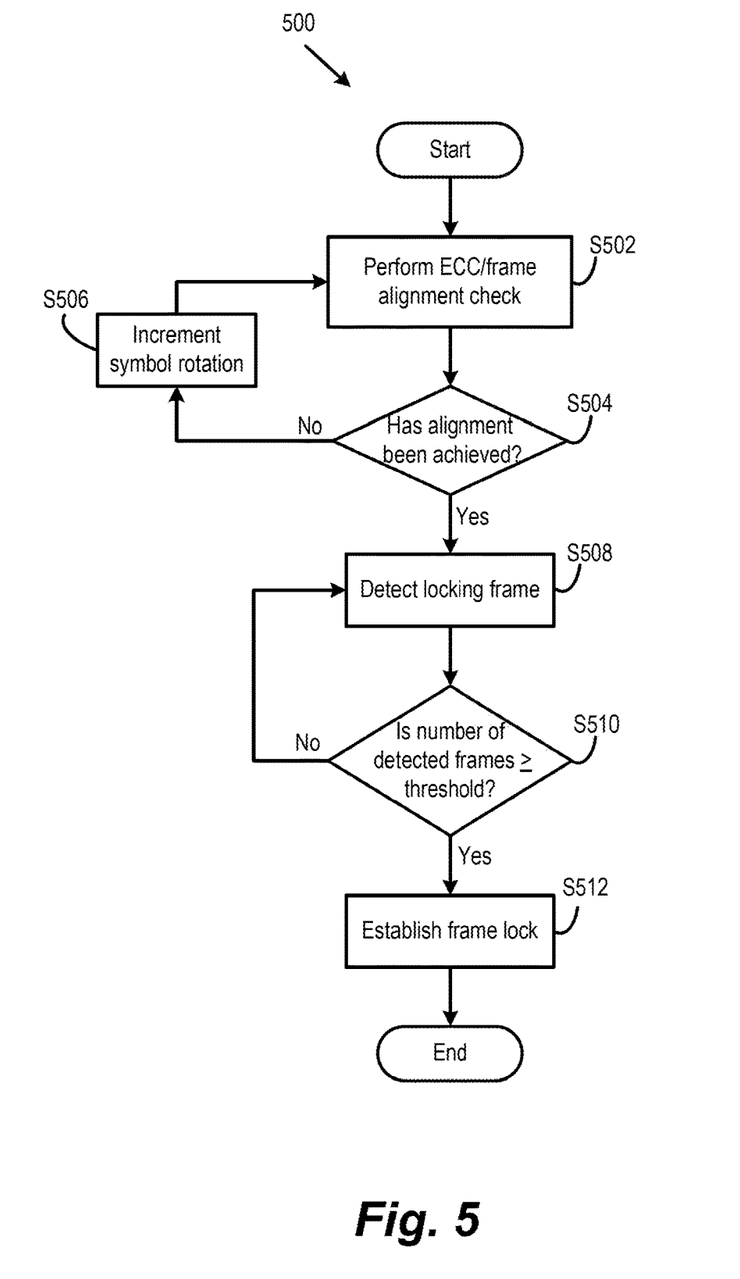
FIG. 5 is an exemplary flowchart of a frame locking process.

FIG. 5 is an exemplary flowchart of a frame locking process 500, which is an implementation of step S404 of the backchannel protocol adaptation process 400. The frame locking process 500 is described with respect to the SerDes devices 300A and 300B described previously herein can also be applied to other devices that are able to communicate via SerDes communication links. In some implementations, the frame locking process 400 provides a three-tiered approach for detecting the locking data frame in the received data stream from the LD which includes an ECC calculation check to determine frame alignment, a predetermined locking data word included in the locking data frame transmitted from the LD, and a consistency check where a predetermined number of locking data frames are detected prior to setting the frame lock condition.

At step S502, once steady-state link conditions have been established for the connection between the LD and the remote LP, the remote LP performs a frame alignment check to detect the presence of a locking frame transmitted by the LD via the communication link that includes performing an ECC calculation for a received 40-bit data stream. In some implementations, once the steady-state data transmissions operations commence, the LD transmits a locking data frame to the remote LP via the communication link at a locking data rate that may correspond to the predetermined data rate of the backchannel data frames 206 or may be unequal to the predetermined data rate of the backchannel data frames 206. The RX decoder module 320 of the remote LP performs the ECC calculation check for sets of forty bits received from the LD.

At step S504, the RX decoder module 320 of the remote LP determines whether frame alignment has been achieved based on the results of the ECC calculation check. If the forty received bits pass the ECC calculation check, then the RX decoder module 320 determines that alignment has been achieved for the detected frame, and step S508 is performed. Otherwise, if the forty received bits fail the ECC calculation check, then the RX decoder module 320 determines that alignment has not been achieved for the detected frame, and step S506 is performed.

At step S506, if the received bits fail the ECC calculation check, then the RX decoder module 320 rotates the bits by one symbol at a symbol rotation rate that corresponds to a predetermined clock cycle. In some implementations, the RX decoder module 320 includes a programmable timer that corresponds to the symbol rotation rate so that the RX decoder module 320 rotates the received bits by one symbol with each cycle of the timer if it is determined that the received bits fail the ECC calculation check at step S504. Once the bits have been rotated by one symbol, the ECC calculation check is re-performed at step S502.

At step S508, the RX decoder module 320 detects the locking data frame by comparing the locking data word in the decoded locking data frame to a predetermined locking data word. For example, the encoder of the LD encodes the predetermined locking data word into the bit positions for the most significant data word bits 212 or the least significant data word bits 214 of the locking data frame, which provides additional assurance that the remote LP has accurately detected the locking data word in the received data stream. Also, the RX decoder module 320 sends the signal 323 to the state machine 380 indicating whether frame alignment has been achieved and whether the locking word in the received locking data frame corresponds to the predetermined locking data word.

At step S510, in response to receiving the signal 323 from the RX decoder module 320, the state machine 380 preforms a consistency check by determining whether the number of detected locking frames is greater or equal to than the predetermined threshold. If the number of detected locking data frames is greater than or equal to the predetermined threshold, resulting in a "yes" at step S510, then step S512 is performed. Otherwise, if the number of detected data frames is less than the predetermined threshold, resulting in a "no" at step S510, then the frame locking process 400 returns to step S508, and the RX decoder module 320 continues to detect locking data frames in the received data stream.

At step S512, the remote LP establishes the frame lock condition when the number of detected data frames is greater than or equal to the predetermined threshold. In some implementations, the state machine 380 is responsible for setting the frame lock condition when a predetermined number of consecutively received locking frames have been received that include the predetermined locking data word. In response to setting the frame lock condition, the state machine 380 outputs signal 383 to the MUX 370, which causes the MUX 370 to output a frame lock interrupt signal to the LD that indicates to the LD that the frame lock condition has been set, and the LD can commence transmitting the backchannel data frames.

Figure 6:
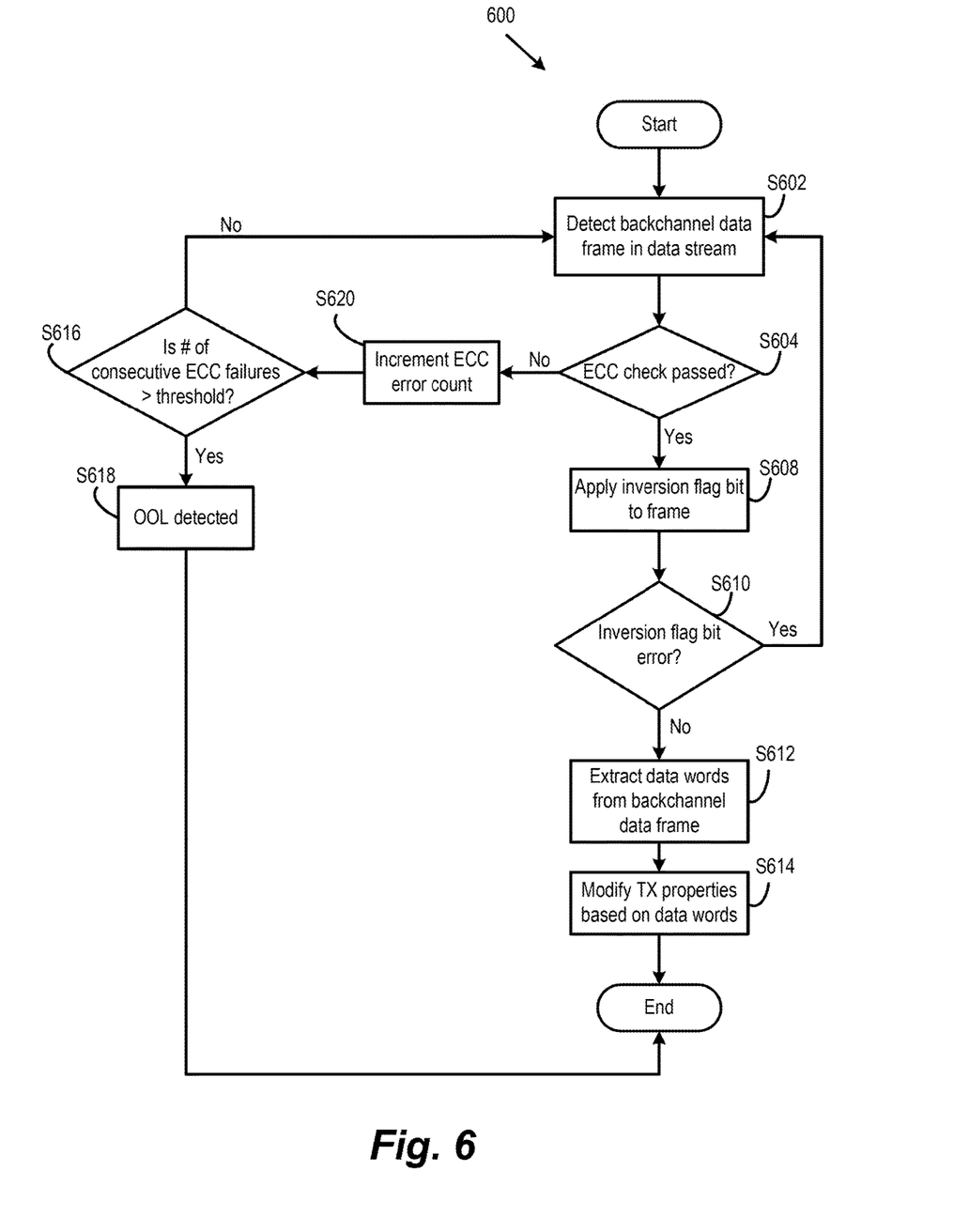
FIG. 6 is an exemplary flowchart of a backchannel messaging process.

FIG. 6 is an exemplary flowchart of a backchannel messaging process 600, which is an implementation of step S406 of the backchannel protocol adaptation process 400. The backchannel messaging process 600 is described with respect to the SerDes devices 300A and 300B described previously herein can also be applied to other devices that are able to communicate via SerDes communication links. The backchannel messaging process 600 provides a way for the LD to communicate the modified signal transmission parameters to the remote LP during steady-state operations, which allows the remote LP to adapt to variations in link conditions even after start-up link training has been performed.

At step S602, the remote LP detects the backchannel data frame from the incoming data stream at the predetermined rate. In some implementations, the backchannel data frame includes one or more sets of bits that are associated with implementing the backchannel protocol for training and adapting a transmitter of the remote LP based on the link environment. For example, the backchannel data frame has forty bits that include seven error correction code (ECC) bits, an inversion flag bit, and sixteen-bit signal information data word bits that can include a most significant data word and a least significant data word.

The predetermined transmission rate can be stored as a three-bit value in a register of the LD and/or remote LP and can be based on one or more factors that can include an amount of variability of one or more communication link parameters or a minimum transmission data bandwidth for the link between the LD and the remote LP. For example, if the communication link connecting the LD and the remote LP experiences cross-talk from one or more adjacent communication links, then the predetermined rate of transmission of the backchannel data frames may be greater than for a communication link that does not experience the effects of cross-talk from adjacent links. In addition, the LD can increase the data rate for the transmission data so that the minimum transmission data bandwidth for the link can be achieved while still transmitting the backchannel data frames.

At step S604, the RX decoder module 320 of the remote LP performs an ECC calculation check on the incoming backchannel data frame. In some implementations, the backchannel data frame includes seven ECC bits that correspond to an ECC that is calculated by the LD for the thirty-two bits associated with the signal information data word bits 216. The ECC bits support one bit error correction and two bit error detection at the remote LP to improve the bit error rate (BER) of the bits transmitted in the backchannel data frame. If the detected backchannel data frame passes the ECC calculation check, resulting in a "yes" at step S604, then step S608 is performed. Otherwise, if the detected backchannel data frame does not pass the ECC calculation check, resulting in a "no" at step S604, then step S620 is performed.

In addition, the RX decoder module 320 of the remote LP outputs the signal 327 the state machine 380, which indicates whether the received backchannel data frame passed or failed the ECC calculation check. At step S620, if the detected data frame failed the ECC calculation check, then the state machine 380 increments a consecutive ECC failure counter based on the signal 327 output from the RX decoder module 320 of the remote LP.

At step S616, the state machine 380 determines whether the number of consecutive ECC calculation check failures for received backchannel data frames is greater than a predetermined threshold based on the value of the ECC failure counter. If the number of consecutive ECC failures is greater than the predetermined threshold, resulting in a "yes" at step S616, then step S618 is performed. Otherwise, if the number of consecutive ECC failures is less than or equal to the predetermined threshold, resulting in a "no" at step S616, then the backchannel messaging process 600 returns to step S602 to detect another backchannel data frame in the incoming data stream from the LD.

At step S618, if the number of consecutive ECC failures is greater than the predetermined threshold, then the state machine 380 determines that an OOL condition has occurred. In response to determining that the OOL condition has occurred, the state machine 380 outputs signal 385 to the MUX 370, which causes the MUX 370 to output a reframing interrupt signal to the LD that indicates to the LD that the remote LP is experiencing the OOL condition. In response to receiving the reframing interrupt signal, the LD can recommence the frame locking process 500 in order to reestablish the frame lock condition with the remote LP.

At step S608, if the detected backchannel data frame passes the ECC calculation check, the RX decoder module 320 of the remote LP applies the inversion flag bit of the backchannel data frame. When the backchannel data frame is encoded into the outgoing data stream at the LD, the inversion flag bit is toggled with each backchannel data frame transmission to provide DC balance to the data stream transmitted across the communication link. When the flag inversion bit is equal to one, the ECC bits and the signal information data word bits are inverted. When the backchannel data frame is received by the remote LP, the RX decoder module 320 performs the XOR operation of all of the bits [39:0] of the backchannel data frame with the inversion flag bit and re-performs the ECC calculation check. If there is an error in the inversion flag bit 210, then the output of the result of the XOR operation will have uncorrectable errors.

At step S610, the RX decoder module 320 of the remote LP determines whether the output of the XOR operation indicates that there is an inversion flag bit error based on the ECC calculation check. If there is an inversion flag bit error, resulting in a "yes" at step S610, then the RX decoder module 320 discards the backchannel data frame, and the backchannel messaging process 600 returns to step S602. If there is no inversion flag bit error, resulting in a "no" at step S610, then step S612 is performed.

At step S612, the RX decoder module 320 of the remote LP extracts the data words from the backchannel data frame. The backchannel data frame includes two sixteen-bit signal information data word bits such as a most significant data word and a least significant data word. In some implementations, the most significant data word is a status data word indicating a current status of the LD. In some implementations, the current status of the LD can indicate that the LD is ready to send and/or receive data from the remote LP. In addition, the least significant data word 214 may be a control data word that indicates one or more modified signal transmission parameters for the transmitter of the remote LP. For example, the modified signal transmission parameters can include FIR filter tap weights, amplitude, and skew control for the transmitter of the remote LP. In addition, if the flag inversion bit 210 is equal to one, the RX decoder module 320 inverts the signal information data word bits in order to determine the current status and/or modified signal transmission parameters.

At step S614, the TX control module 350 of the remote LP receives the modified signal transmission parameters from the RX decoder module 320 via the signal 324 and modifies one or more signal processing properties of the transmitter to reflect the modified signal transmission parameters. In some implementations, the TX control module 350 includes a microcode that is responsible for receiving the modified signal transmission parameters decoded by the RX decoder module 320, validating the signal transmission parameters, applying the modified signal transmission parameters to a local TX FIR filter or other processing components of the transmitter, and generating a response to be sent to the remote LP.

Figure 7:
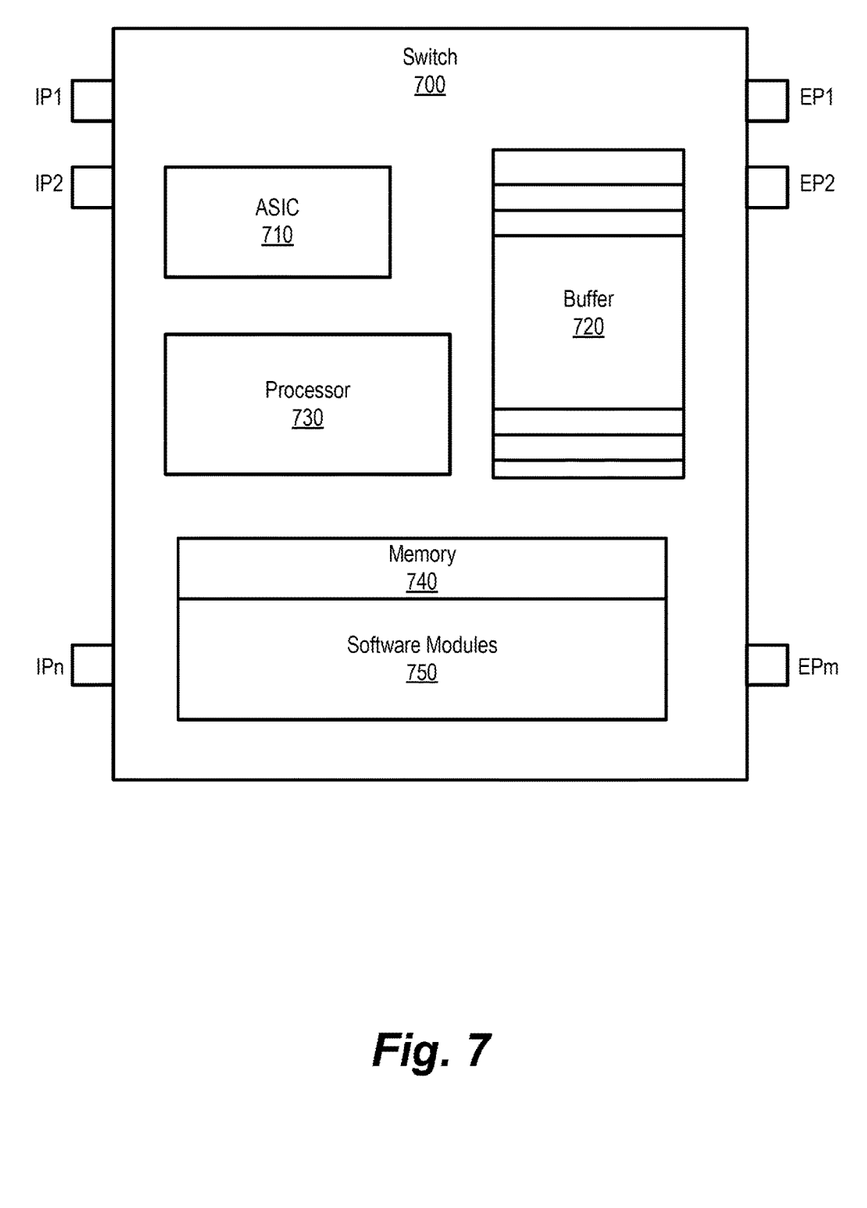
FIG. 7 is an exemplary hardware block diagram of a communication device.

FIG. 7 illustrates an example of a communication device 700 employing features of the subject technology in accordance with one or more implementations of the subject technology. Examples of the communication device 700 includes an Ethernet switch of an Ethernet network such as a private network including a data-center network, an enterprise network, or other private networks. In some implementations the communication device 700 can include the features of any of the devices 300A or 300B described previously herein. The communication device 700 includes a number of ingress (input) ports IP1-IPn and multiple egress (output) ports EP1-EPm. In one or more implementations, one or more of the ingress ports IP1-IPn of the can receive a data packet form another switch or and endpoint device of the network. The communication device 700 further includes a hardware component such as an application specific integrated circuit (ASIC) 710 (which in some embodiments can be implemented as a field-programmable logic array (FPGA)), a buffer 720, a processor 730, memory 740, and a software module 750.

In some implementations, the ASIC 710 can include suitable logic, circuitry, interfaces and/or code that can be operable to perform functionalities of a PHY circuit. The buffer 720 includes suitable logic, circuitry, code and/or interfaces that are operable to receive and store and/or delay a block of data for communication through one or more of the egress ports EP1-EPm. The processor 730 includes suitable logic, circuitry, and/or code that can enable processing data and/or controlling operations of the communication device 700.

In this regard, the processor 730 can be enabled to provide control signals to various other portions of the communication device 700. The processor 730 also controls transfers of data between various portions of the communication device 700. Additionally, the processor 730 can enable implementation of an operating system or otherwise execute code to manage operations of the communication device 700.

In some implementations, the processor 730 includes circuitry configured to execute one or more software processes associated with the software components of the SerDes devices 300A and 300B. For example, the circuitry can perform processes associated with the backchannel training and adaptation process 400, frame locking process 500, and the backchannel messaging process 600 that correspond to the functions of the RX decoder module 320, RX tuning and feedback module 330, RX encoder module 340, TX control module 350, and state machine 380.

The memory 740 includes suitable logic, circuitry, and/or code that can enable storage of various types of information such as received data, generated data, code, and/or configuration information. The memory 740 includes, for example, RAM, ROM, flash, and/or magnetic storage. In various embodiment of the subject technology, the memory 740 may include a RAM, DRAM, SRAM, T-RAM, Z-RAM, TTRAM, or any other storage media. The memory 740 can include software modules 750 that when executed by a processor (e.g., processor 730) can perform some or all of the functionalities of the ASIC 710. In some implementations, the software modules 750 include codes that when executed by a processor can perform functionalities such as configuration of the communication device 700.

Aspects of the present disclosure are directed to improving quality of communications between SerDes devices by performing steady-state link training and adaptation of a remote LP of a communication link based on measured signal distortions at a LD. In some implementations, modifying signal transmission parameters of the remote LP, such as taps of a FIR filter is less complex, consumes less power, and can provide better channel equalization than applying an equalizer such as a DFE at the receiver. The modified signal transmission parameters can be encoded into a backchannel data frame that is inserted into a data stream transmitted from the LD at a predetermined data rate. The remote LP detects the backchannel data frame in the data stream, decodes the bits of the backchannel data stream to extract the modified signal transmission parameters, and applies the modified signal transmission parameters to the transmitted data stream. By increasing reliability of the link by communicating the backchannel data frame to the remote LP, few link disruptions occur due to communication link errors.

The backchannel data frame consumes a very small amount of bandwidth compared to the total data stream bandwidth and can be utilized on multiple link segments. For example, the implementations described herein can also be implemented in a retime device that a length of the communication link to be extended. In addition, the backchannel data frame can be overlaid onto any type of data bit stream that employs statistical scrambling. Also, the predetermined data rate at which the backchannel data frame is transmitted can be modified to avoid any matches with a known traffic protocol.

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Additionally, an implementation may be performed on modules or hardware not identical to those described. Accordingly, other implementations are within the scope that may be claimed.

The invention claimed is:

1. An electronic device comprising:
   circuitry configured to
     establish a steady-state connection with another device via a communication link,
     detect a backchannel data frame in a steady-state data stream received from the another device via the communication link at a first predetermined data rate, and
     modify one or more signal transmission parameters based on signal information included in the backchannel data frame,
     wherein the circuitry is further configured to detect a locking data frame received from the another device at a second predetermined data rate that includes a predetermined locking data word.

2. The device of claim 1, wherein the electronic device and the another device are serializer/deserializer (SERDES) devices.

3. The device of claim 1, wherein the backchannel data frame includes at least one of one or more error correction code (FCC) bits, a frame inversion bit, or one or more signal information words.

4. The device of claim 3, wherein the one or more signal information words include at least one of a control data word indicating one or more modified signal transmission parameters or a status data word indicating a current status of the another device.

5. The device of claim 1, wherein the circuitry is further configured to detect the locking data frame in a case that a received data frame has a number of detected errors that is less than a predetermined threshold and one or more received bits of the received data frame correspond to the predetermined locking data word.

6. The device of claim 5, wherein the circuitry is further configured to set a frame lock condition in a case that the number of consecutively detected locking data frames is greater than a predetermined threshold.

7. The device of claim 6, wherein the circuitry is further configured to output a frame lock interrupt to the another device via the communication link in response to setting the frame lock condition.

8. The device of claim 6, wherein the circuitry is further configured to detect the backchannel data frame at the first predetermined data rate in response to setting the frame lock condition.

9. The device of claim 1, wherein the second predetermined data rate is greater than the first predetermined data rate.

10. The device of claim 1, wherein the first predetermined data rate is based on at least one of an amount of variability of one or more communication link parameters or a transmission data bandwidth of the communication link.

11. The device of claim 1, wherein the circuitry is further configured to determine that an out of lock (OOL) condition exists in a case that a number of consecutively received backchannel data frames that fail an ECC check is greater than a predetermined threshold.

12. The device of claim 11, wherein the circuitry is further configured to output a reframing interrupt signal to the another device in the case that the OOL condition exists.

13. The device of claim 1, wherein the circuitry is further configured to invert one or more bits of the backchannel data frame in a case that a frame inversion bit is equal to one.

14. The device of claim 1, wherein the circuitry is further configured to determine one or more modified signal transmission parameters from a most significant data word or a least significant data word of the backchannel data frame.

15. The device of claim 14, wherein the circuitry is further configured to modify one or more finite impulse response (FIR) filter taps of the device based on the modified signal transmission parameters.

16. The device of claim 14, wherein the one or more modified signal transmission parameters correspond to duty cycle distortion (DCD) or digital-to-analog converter (DAC) skew correction parameters.

17. The device of claim 14, wherein the circuitry is further configured to output a backchannel response to the another device via the communication link when a number of the backchannel data frames with corresponding signal transmission parameters is greater than a predetermined threshold.

18. A method comprising:
    establishing, at an electronic device with circuitry, a steady-state connection with another device via a communication link;
    detecting, via the circuitry, a backchannel data frame in a steady-state data stream received from the another device via the communication link at a first predetermined data rate; and
    modifying, via the circuitry, one or more signal transmission parameters of a transmitter included in the electronic device based on signal information included in the backchannel data frame,
    wherein the method further includes detecting a locking data frame received from the another device at a second predetermined data rate that includes a predetermined locking data word.

19. An electronic device comprising:
circuitry configured to
    establish a steady-state connection with another device via an Ethernet communication link,
    extract one or more modified signal transmission parameters from a detected backchannel data frame in a data stream received from the another device via the Ethernet communication link, and
    modify one or more signal processing parameters of an Ethernet transmitter included in the electronic device based on the one or more modified signal transmission parameters included in the backchannel data frame,
    wherein the circuitry is further configured to detect a locking data frame received from the another device at a second predetermined data rate that includes a predetermined locking data word.

* * * * *